(12) United States Patent
Press et al.

(10) Patent No.: US 8,972,431 B2
(45) Date of Patent: Mar. 3, 2015

(54) SYNONYM SUPPORTED SEARCHES

(75) Inventors: William A. Press, Berkeley, CA (US);
Nicholas B. Geh, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 605 days.

(21) Appl. No.: 12/850,502

(22) Filed: Aug. 4, 2010

(65) Prior Publication Data
US 2011/0276580 A1    Nov. 10, 2011

Related U.S. Application Data

(60) Provisional application No. 61/332,092, filed on May 6, 2010.

(51) Int. Cl.
*G06F 17/30* (2006.01)

(52) U.S. Cl.
CPC ............................... *G06F 17/30401* (2013.01)
USPC ............ 707/759; 707/706; 707/713; 707/722; 707/736; 707/737; 707/758; 707/769; 707/781

(58) Field of Classification Search
USPC ......... 707/706, 713, 722, 736, 737, 758, 759, 707/769, 781, 999.001–6
See application file for complete search history.

(56) References Cited

U.S. PATENT DOCUMENTS

| | | |
|---|---|---|
| 5,072,370 A | 12/1991 | Durdik |
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,787,437 A | 7/1998 | Potterveld et al. |

(Continued)

FOREIGN PATENT DOCUMENTS

WO    WO/2004059420    7/2004

OTHER PUBLICATIONS

[online]; [published on Oct. 17, 2008]; [retrieved on Feb. 26, 2010]; retrieved from http://en.wikipedia.org/wiki/Push_technology.

(Continued)

*Primary Examiner* — Syling Yen
(74) *Attorney, Agent, or Firm* — Weaver Austin Villeneuve & Sampson LLP

(57) ABSTRACT

Systems and methods for performing a data search through a search query is disclosed. The method includes receiving the search query and parsing the search query to retrieve a search term. The search term includes a plurality of words. In the search term, a first combination of two or more of the plurality of words and a second combination of two or more of the plurality of words are indentified. The first combination and the second combination include a common term. The first combination ends with the common term and the second combination begins with the common term. The method further includes retrieving synonyms for the first combination and the second combination exist in a synonym storage and the search query is then modified to include the first combination in a logical OR relationship with the synonyms of the first combination and the second combination in a logical OR relationship with the synonyms of the second combination. The modified search query is executed against a data store.

20 Claims, 6 Drawing Sheets

(56) References Cited

U.S. PATENT DOCUMENTS

| | | | |
|---|---|---|---|
| 5,794,232 A | 8/1998 | Mahlum et al. |
| 5,819,038 A | 10/1998 | Carleton et al. |
| 5,821,937 A | 10/1998 | Tonelli et al. |
| 5,831,610 A | 11/1998 | Tonelli et al. |
| 5,832,500 A * | 11/1998 | Burrows ............................ 1/1 |
| 5,873,096 A | 2/1999 | Lim et al. |
| 5,918,159 A | 6/1999 | Fomukong et al. |
| 5,941,947 A | 8/1999 | Brown et al. |
| 5,950,190 A | 9/1999 | Yeager et al. |
| 5,963,953 A | 10/1999 | Cram et al. |
| 5,974,409 A | 10/1999 | Sanu et al. |
| 5,983,227 A | 11/1999 | Nazem et al. |
| 5,987,471 A | 11/1999 | Bodine et al. |
| 6,064,656 A | 5/2000 | Angal et al. |
| 6,085,191 A | 7/2000 | Fisher et al. |
| 6,092,083 A | 7/2000 | Brodersen et al. |
| 6,112,198 A | 8/2000 | Lohman et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,000 B1 | 2/2001 | Gwertzman et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,219,667 B1 | 4/2001 | Lu et al. |
| 6,226,641 B1 | 5/2001 | Hickson et al. |
| 6,233,617 B1 | 5/2001 | Rothwein et al. |
| 6,233,618 B1 | 5/2001 | Shannon |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,330,560 B1 | 12/2001 | Harrison et al. |
| 6,336,137 B1 | 1/2002 | Lee et al. |
| 6,341,288 B1 | 1/2002 | Yach et al. |
| 6,345,288 B1 | 2/2002 | Reed et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,438,562 B1 | 8/2002 | Gupta et al. |
| 6,446,089 B1 | 9/2002 | Brodersen et al. |
| 6,446,109 B2 | 9/2002 | Gupta |
| 6,453,038 B1 | 9/2002 | McFarlane et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,578,037 B1 | 6/2003 | Wong et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,148 B1 | 8/2003 | Salo et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,658,417 B1 | 12/2003 | Statukis et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,721,765 B2 | 4/2004 | Ghosh et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,839,608 B2 | 1/2005 | Liu et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 6,944,133 B2 | 9/2005 | Wisner et al. |
| 6,947,927 B2 | 9/2005 | Chaudhuri et al. |
| 7,062,502 B1 | 6/2006 | Kesler |
| 7,076,633 B2 | 7/2006 | Tormasov et al. |
| 7,100,111 B2 | 8/2006 | McElfresh et al. |
| 7,152,109 B2 | 12/2006 | Suorsa et al. |
| 7,174,483 B2 | 2/2007 | Worrall et al. |
| 7,181,758 B1 | 2/2007 | Chan |
| 7,185,192 B1 | 2/2007 | Kahn |
| 7,206,805 B1 | 4/2007 | McLaughlin, Jr. |
| 7,206,807 B2 | 4/2007 | Cheenath |
| 7,209,929 B2 | 4/2007 | Dominguez, Jr. et al. |
| 7,249,118 B2 | 7/2007 | Sandler et al. |
| 7,269,590 B2 | 9/2007 | Hull et al. |
| 7,289,976 B2 | 10/2007 | Kihneman et al. |
| 7,305,577 B2 | 12/2007 | Zhang |
| 7,308,704 B2 | 12/2007 | Vogel et al. |
| 7,340,411 B2 | 3/2008 | Cook |
| 7,350,237 B2 | 3/2008 | Vogel et al. |
| 7,356,482 B2 | 4/2008 | Frankland et al. |
| 7,373,364 B1 | 5/2008 | Chapman |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,448,079 B2 | 11/2008 | Tremain |
| 7,454,509 B2 | 11/2008 | Boulter et al. |
| 7,484,219 B2 | 1/2009 | Mitra |
| 7,508,789 B2 | 3/2009 | Chan |
| 7,529,728 B2 | 5/2009 | Weissman et al. |
| 7,577,092 B2 | 8/2009 | San Andres et al. |
| 7,580,975 B2 | 8/2009 | Cheenath |
| 7,599,935 B2 | 10/2009 | La Rotonda et al. |
| 7,599,953 B2 | 10/2009 | Galindo-Lagaria et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,661,027 B2 | 2/2010 | Langen et al. |
| 7,668,861 B2 | 2/2010 | Steven |
| 7,693,820 B2 | 4/2010 | Larson et al. |
| 7,698,160 B2 | 4/2010 | Beaven et al. |
| 7,730,478 B2 | 6/2010 | Weissman |
| 7,734,608 B2 | 6/2010 | Fell et al. |
| 7,747,648 B1 | 6/2010 | Kraft et al. |
| 7,769,825 B2 | 8/2010 | Karakashian et al. |
| 7,774,366 B2 | 8/2010 | Fisher et al. |
| 7,779,039 B2 | 8/2010 | Weissman et al. |
| 7,779,475 B2 | 8/2010 | Jakobson et al. |
| 7,814,052 B2 | 10/2010 | Bezar et al. |
| 7,814,470 B2 | 10/2010 | Mamou et al. |
| 7,827,138 B2 | 11/2010 | Salmon et al. |
| 7,827,208 B2 | 11/2010 | Bosworth et al. |
| 7,849,401 B2 | 12/2010 | Elsa et al. |
| 7,853,881 B1 | 12/2010 | Assal et al. |
| 7,890,521 B1 * | 2/2011 | Grushetskyy et al. ........ 707/755 |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |

(56) References Cited

U.S. PATENT DOCUMENTS

| | | | |
|---|---|---|---|
| 8,095,594 B2 | 1/2012 | Beaven et al. | |
| 8,103,611 B2 | 1/2012 | Tuzhilin et al. | |
| 8,150,913 B2 | 4/2012 | Cheah | |
| 8,209,308 B2 | 6/2012 | Rueben et al. | |
| 8,209,333 B2 | 6/2012 | Hubbard et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 2001/0023440 A1 | 9/2001 | Franklin et al. | |
| 2001/0044791 A1 | 11/2001 | Richter et al. | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0133392 A1 | 9/2002 | Angel et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015578 A1 | 1/2004 | Karakashian et al. | |
| 2004/0015981 A1 | 1/2004 | Coker et al. | |
| 2004/0027388 A1 | 2/2004 | Berg et al. | |
| 2004/0044656 A1 | 3/2004 | Cheenath | |
| 2004/0045004 A1 | 3/2004 | Cheenath | |
| 2004/0111410 A1 | 6/2004 | Burgoon et al. | |
| 2004/0122656 A1* | 6/2004 | Abir | 704/4 |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0205079 A1* | 10/2004 | Azzam | 707/100 |
| 2004/0220952 A1 | 11/2004 | Cheenath | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0283478 A1 | 12/2005 | Choi et al. | |
| 2006/0095960 A1 | 5/2006 | Arregoces et al. | |
| 2006/0100912 A1 | 5/2006 | Kumar et al. | |
| 2006/0136382 A1 | 6/2006 | Dettinger et al. | |
| 2006/0265391 A1* | 11/2006 | Posner et al. | 707/10 |
| 2007/0022109 A1* | 1/2007 | Imielinski et al. | 707/4 |
| 2007/0078705 A1 | 4/2007 | Abels et al. | |
| 2007/0088741 A1 | 4/2007 | Brooks et al. | |
| 2007/0124276 A1 | 5/2007 | Weissman et al. | |
| 2007/0130130 A1 | 6/2007 | Chan et al. | |
| 2007/0130137 A1 | 6/2007 | Oliver et al. | |
| 2007/0150546 A1 | 6/2007 | Karakashian et al. | |
| 2007/0226640 A1 | 9/2007 | Holbrook et al. | |
| 2008/0010243 A1 | 1/2008 | Weissman et al. | |
| 2008/0082540 A1 | 4/2008 | Weissman et al. | |
| 2008/0082572 A1* | 4/2008 | Ballard et al. | 707/102 |
| 2008/0082986 A1 | 4/2008 | Cheenath et al. | |
| 2008/0086358 A1 | 4/2008 | Doshi et al. | |
| 2008/0086447 A1 | 4/2008 | Weissman et al. | |
| 2008/0086479 A1 | 4/2008 | Fry et al. | |
| 2008/0086482 A1 | 4/2008 | Weissman et al. | |
| 2008/0086514 A1 | 4/2008 | Weissman et al. | |
| 2008/0086567 A1 | 4/2008 | Langen et al. | |
| 2008/0086735 A1 | 4/2008 | Cheenath et al. | |
| 2008/0162544 A1 | 7/2008 | Weissman et al. | |
| 2008/0201701 A1 | 8/2008 | Hofhansel et al. | |
| 2008/0215560 A1 | 9/2008 | Bell et al. | |
| 2008/0249972 A1 | 10/2008 | Dillon | |
| 2008/0270354 A1 | 10/2008 | Weissman et al. | |
| 2008/0270987 A1 | 10/2008 | Weissman et al. | |
| 2009/0030906 A1 | 1/2009 | Doshi et al. | |
| 2009/0049065 A1 | 2/2009 | Weissman et al. | |
| 2009/0049101 A1 | 2/2009 | Weissman et al. | |
| 2009/0049102 A1 | 2/2009 | Weissman et al. | |
| 2009/0049288 A1 | 2/2009 | Weissman et al. | |
| 2009/0063415 A1 | 3/2009 | Chatfield et al. | |
| 2009/0100342 A1 | 4/2009 | Jakobson | |
| 2009/0171907 A1* | 7/2009 | Radovanovic | 707/3 |
| 2009/0177744 A1 | 7/2009 | Marlow et al. | |
| 2009/0276395 A1 | 11/2009 | Weissman et al. | |
| 2009/0276405 A1 | 11/2009 | Weissman et al. | |
| 2009/0282045 A1* | 11/2009 | Hsieh et al. | 707/9 |
| 2009/0319529 A1 | 12/2009 | Bartlett et al. | |
| 2010/0191719 A1 | 7/2010 | Weissman et al. | |
| 2010/0205216 A1 | 8/2010 | Durdik et al. | |
| 2010/0211619 A1 | 8/2010 | Weissman et al. | |
| 2010/0223284 A1 | 9/2010 | Brooks et al. | |
| 2010/0235837 A1 | 9/2010 | Weissman et al. | |
| 2010/0274779 A1 | 10/2010 | Weissman et al. | |
| 2011/0066620 A1* | 3/2011 | Redfern et al. | 707/741 |
| 2011/0145247 A1* | 6/2011 | Norris et al. | 707/737 |
| 2012/0233137 A1 | 9/2012 | Jakobson et al. | |
| 2012/0290407 A1 | 11/2012 | Hubbard et al. | |
| 2013/0218948 A1 | 8/2013 | Jakobson | |
| 2013/0218949 A1 | 8/2013 | Jakobson | |
| 2013/0218966 A1 | 8/2013 | Jakobson | |

OTHER PUBLICATIONS

[online]; [published on Oct. 16, 2008]; [retrieved on Feb. 26, 2010]; retrieved from http://en.wikipedia.org/wiki/Customer$_{13}$ Relationship_Management.

[online]; [published on Apr. 22, 2008]; [retrieved on Feb. 26, 2010]; retrieved from http://en.wikipedia.org/wiki/Flat_file_database.

[online]; [published on Apr. 25, 2008]; [retrieved on Feb. 26, 2010]; retrieved from http://en.wikipedia.org/wiki/Relational_database.

First named inventor: Yancey, Scott, U.S. Appl. No. 12/636,658, filed Dec. 11, 2009.

First named inventor: Yancey, Scott, U.S. Appl. No. 12/636,675, filed Dec. 11, 2009.

First named inventor: Doshi, Kedar, U.S. Appl. No. 12/167,991, filed Jul. 3, 2008.

First named inventor: Bezar, Eric, U.S. Appl. No. 12/569,603, filed Sep. 2, 2010.

First named inventor: Yancey, Scott, U.S. Appl. No. 12/132,409, filed Jun. 3, 2008.

First named inventor: Durdik, Paul, U.S. Appl. No. 12/549,349, filed Aug. 27, 2009.

Lee et al: "Composition of executable business process models by combining business rules and process flows", Expert Systems With Application, Oxford, GB, vol. 33, No. 1, Dec. 22, 2006, pp. 221-229.

Mietzer et al: "Combining Different Multi-tenancy Patterns in Service Oriented Applications", IEE International Enterprise Distributed Object Computing Conference, NJ, USA, Sep. 1, 2009, pp. 131-140.

(56) References Cited

OTHER PUBLICATIONS

Wang et al: "Integrated Constraint Violation Handling for Dynamic Services Composition", IEE International Conference on Services Computing, NJ, USA, Sep. 21, 2009, pp. 168-175.

Wermelinger et al: "Using coordination contracts for flexible adaptation to changing business rules", Proceedings of the Sixth International Workshop on Software Evolution, NJ, USA, Sep. 1, 2003, pp. 115-120.

Wang et al: "A Study and Performance Evaluation of the Multi-Tenant Data Tier Design Patterns for Service Oriented Computing", IEE International Conference on E-Business Engineering, NJ, USA, Oct. 22, 2008, pp. 94-101.

Notification of Transmittal of the International Search Report and the Written Opinion of the International Searching Authority, or the Declaration. International Application Number: PCT/US2010/050021. International Filing Date: Sep. 23, 2010.

First named inventor: Yancey, Scott, U.S. Appl. No. 12/197,979, filed Aug. 25, 2008.

First named inventor: Calahan, Patrick, U.S. Appl. No. 12/954,556, filed Nov. 24, 2010.

First named inventor: Varadharajan, Arunkumaran, U.S. Appl. No. 12/909,820, filed Oct. 21, 2010.

First named inventor: Pin, Oliver, U.S. Appl. No. 12/895,833, filed Sep. 30, 2010.

First named inventor: Tanaka, Jay, U.S. Appl. No. 12/831,209, filed Jul. 6, 2010.

First named inventor: Tanaka, Jay, U.S. Appl. No. 12/831,196, filed Jul. 6, 2010.

First named inventor: Williams, Alexis, U.S. Appl. No. 13/028,236, filed Feb. 16, 2011.

"Google Plus Users", Google+Ripples, Oct. 31, 2011 [retrieved on Feb. 21, 2012 from Internet at http://www.googleplusers.com/google-ripples.html], 3 pages.

\* cited by examiner

| Key | Synonyms |
|---|---|
| Ben | Benjamin |
| Jerry | Jerome |
| Home | House, castle |
| United | Joined |
| United states | USA, America |
| Bailout | TARP |
| ata | A.t.a, serial-ata, serial ata, s-ata, external serial ata, esata |

SYNONYM SUPPORTED SEARCHES

CROSS REFERENCE TO RELATED APPLICATIONS

This application claims the benefit of U.S. Provisional Application No. 61/332,092 filed on May 6, 2010.

BACKGROUND

The present invention relates generally to data searches, and more particularly to synonym supported searches in data stores.

To search data stored in databases, a database query needs to particularly specify what type of data is being searched. For example, if the data being searched is stored in a relational database table having multiple columns, the search query (e.g., an SQL Query) must specify which column or columns may include the data being searched.

Search engines have simplified searching for data stored in various types of data stores, in that a plain language search query may be used to retrieve data from various sources. Search engines generally browse through various data sources to create indexes. A search query is processed with the help of these indexes. The indexes generally include keywords and destinations the keywords in data stores.

However, the search query still must specify the exact words or phrases that need to be matched with the content of these various data sources. For example, if a search query includes the search criteria "home address" and if the underlying data source identifies this information as "house address," the query would not retrieve the desired results. Some commercial search engines have built in logic to correct spelling mistakes in the search queries. Also, some commercial search engines are also configured to provide suggestions as to similar sounding terms for the searched terms.

SUMMARY

Methods and systems for modifying search queries to add synonyms for words and phrases are disclosed. The modification of search queries also includes handling overlapping phrases in order to modify search queries to include synonyms for overlapping terms, if a synonym database provides synonyms for the overlapping terms.

In one embodiment, a method for performing a data search through a search query is disclosed. The method includes receiving the search query and parsing the search query to retrieve a search term. The search term includes a plurality of words. In the search term, a first combination of two or more of the plurality of words and a second combination of two or more of the plurality of words are indentified. The first combination and the second combination include a common term. The first combination ends with the common term and the second combination begins with the common term. The method further includes retrieving synonyms for the first combination and the second combination exist in a synonym storage and the search query is then modified to include the first combination in a logical OR relationship with the synonyms of the first combination and the second combination in a logical OR relationship with the synonyms of the second combination. The modified search query is executed against a search index or a data base.

In another embodiment, a non-transitory computer readable media having programming instructions for performing a data search through a search query is disclosed. The programming instructions, when executed by a microprocessor perform the following method steps: receiving the search query and parsing the search query to retrieve a search term. The search term includes a plurality of words. In the search term, a first combination of two or more of the plurality of words and a second combination of two or more of the plurality of words are indentified. The first combination and the second combination include a common term. The first combination ends with the common term and the second combination begins with the common term. The method further includes retrieving synonyms for the first combination and the second combination exist in a synonym storage and the search query is then modified to include the first combination in a logical OR relationship with the synonyms of the first combination and the second combination in a logical OR relationship with the synonyms of the second combination. The modified search query is executed against a data store.

In yet another embodiment, a system for performing a data search through a search query is disclosed. The system includes an application server in communication with a client computing system, the application server including a synonym processing module in communication with a synonym database. The synonym processing module is configured to retrieve synonyms for overlapping search terms in the search query. The overlapping search terms being two search terms having an overlapping common term. The system further includes a query server in communication with the application server. The query server is also in communication with a index database. A data store is included. The data store is in communication with the query server. An indexer module is also included to retrieve keywords from the data store and to store, in the index database, the keywords and location of the keywords in the data store.

Other objects, features, and advantages of the present invention will be apparent from the accompanying drawings and from the detailed description that follows below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. The present invention is illustrated by way of example, and not by way of limitation, in the figures of the accompanying drawings and in which like reference numerals refer to similar elements and in which.

DETAILED DESCRIPTION

An approach for modifying search queries to include synonyms for the searched terms in the search queries is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are illustrated in block diagram form in order to avoid unnecessarily obscuring the present invention.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
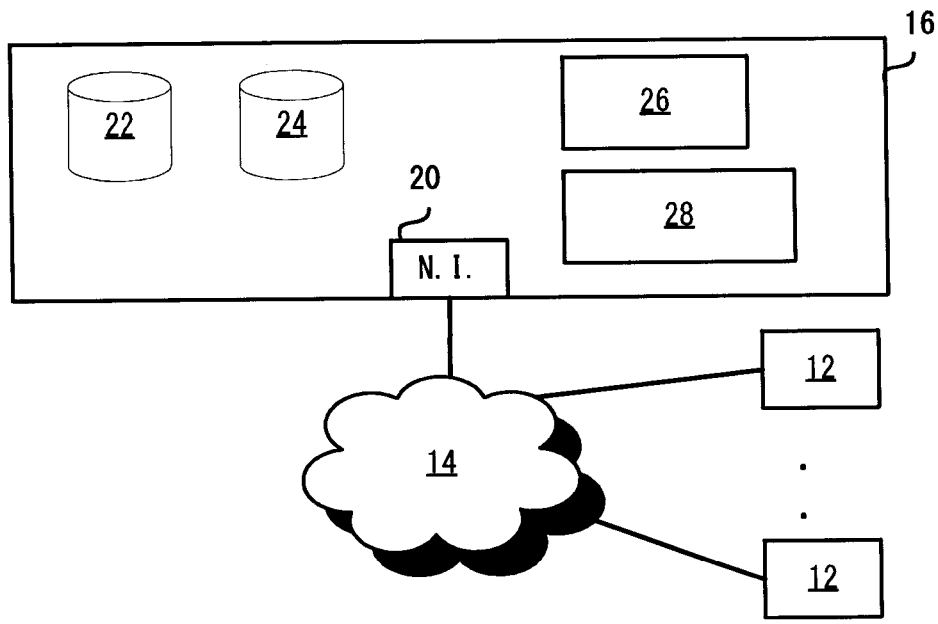
FIG. 1 illustrates an environment in which a multi-tenant database system (MTS) might be used according to one or more embodiments.

FIG. 1 illustrates an environment in which a multi-tenant database system might be used. As illustrated in FIG. 1 (and in more detail in FIG. 2) any user systems 12 might interact via a network 14 with a multi-tenant database system (MTS) 16. The users of those user systems 12 might be users in differing capacities and the capacity of a particular user system 12 might be entirely determined by the current user. For example, where a salesperson is using a particular user system 12 to interact with MTS 16, that user system has the capacities allotted to that salesperson. However, while an administrator is using that user system to interact with MTS 16, that user system has the capacities allotted to that administrator.

Network 14 can be a LAN (local area network), WAN (wide area network), wireless network, point-to-point network, star network, token ring network, hub network, or other. configuration. As the most common type of network in current use is a TCP/IP (Transfer Control Protocol and Internet Protocol) network such as the global internetwork of networks often referred to as the "Internet" with a capital "I," that will be used in many of the examples herein, but it should be understood that the networks that the present invention might use are not so limited, although TCP/IP is the currently preferred protocol.

User systems 12 might communicate with MTS 16 using TCP/IP and, at a higher network level, use other common Internet protocols to communicate, such as HTTP, FTP, AFS, WAP, etc. As an example, where HTTP is used, user system 12 might include an HTTP client commonly referred to as a "browser" for sending and receiving HTTP messages from an HTTP server at MTS 16. Such HTTP server might be implemented as the sole network interface between MTS 16 and network 14, but other techniques might be used as well or instead. In some implementations, the interface between MIS 16 and network 14 includes load sharing functionality, such as round-robin HTTP request distributors to balance loads and distribute incoming HTTP requests evenly over a plurality of servers. Preferably, each of the plurality of servers has access to the MTS's data, at least as for the users that are accessing that server.

In preferred aspects, the system shown in FIG. 1 implements a web-based customer relationship management (CRM) system. For example, in one aspect, MTS 16 can include application servers configured to implement and execute CRM software applications as well as provide related data, code, forms, web pages and other information to and from user systems 12 and to store to, and retrieve from, a database system related data, objects and web page content. With a multi-tenant system, tenant data is preferably arranged so that data of one tenant is kept separate from that of other tenants so that one tenant does not have access to another's data, unless such data is expressly shared.

One arrangement for elements of MTS 16 is shown in FIG. 1, including a network interface 20, storage 22 for tenant data, storage 24 for system data accessible to MTS 16 and possibly multiple tenants, program code 26 for implementing various functions of MTS 16, and a process space 28 for executing MTS system processes and tenant-specific processes, such as running applications as part of an application service.

Several elements in the system shown in FIG. 1 include conventional, well-known elements that need not be explained in detail here. For example, each user system 12 could include a desktop personal computer, workstation, laptop, PDA, cell phone, or any WAP-enabled device or any other computing device capable of interfacing directly or indirectly to the Internet or other network connection. User system 12 typically runs an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system) of user system 12 to access, process and view information and pages available to it from MTS 16 over network 14. Each user system 12 also typically includes one or more user interface devices, such as a keyboard, a mouse, touch screen, pen or the like, for interacting with a graphical user interface (GUI) provided by the browser on a display (e.g., monitor screen, LCD display, etc.) in conjunction with pages, forms and other information provided by MTS 16 or other systems or servers. As discussed above, the present invention is suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium processor or the like. Similarly, MTS 16 (and additional instances of MTS's, where more than one is present) and all of their components might be operator configurable using application(s) including computer code run using a central processing unit such as an Intel Pentium processor or the like, or multiple processor units. Computer code for operating and configuring MTS 16 to intercommunicate and to process web pages and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C++, HTML, Java, JavaScript, any other scripting language, such as VBScript and many other programming languages as are well known.

According to one embodiment, each MTS 16 is configured to provide web pages, forms, data and media content to user systems 12 to support the access by user systems 12 as tenants of MTS 16. As such, MTS 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., RDBMS) as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Figure 2:
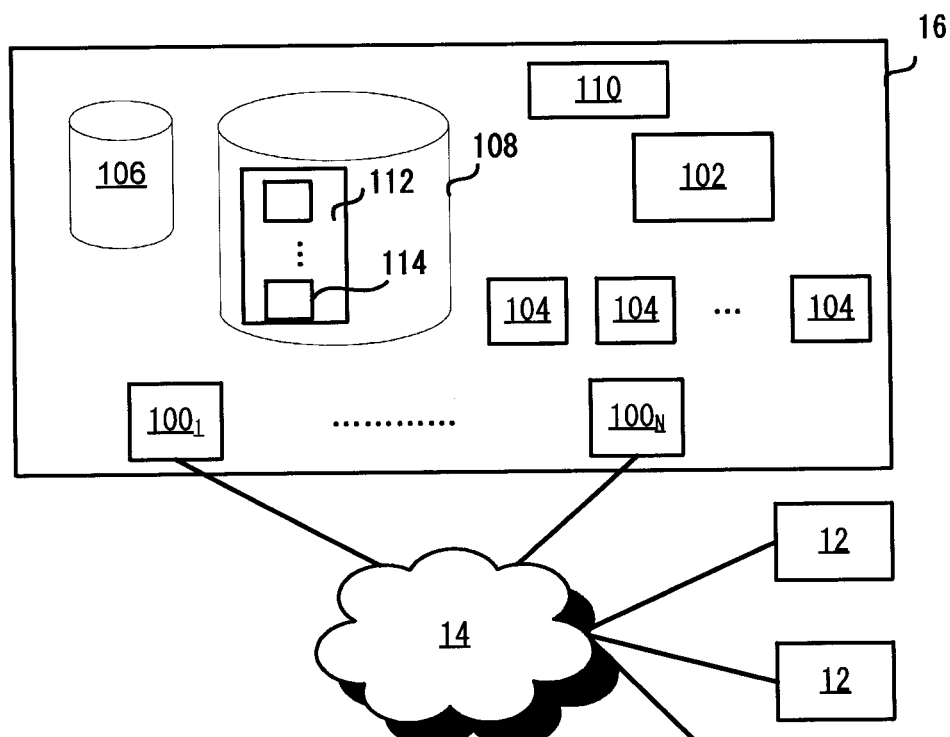
FIG. 2 illustrates elements of a MTS and interconnections therein in more detail according to one or more embodiments.

FIG. 2 illustrates elements of MTS 16 and various interconnections in more detail. In this example, the network interface is implemented as one or more HTTP application servers 100. Also shown is system process space 102 including individual tenant process spaces 104, a system database 106, tenant database(s) 108 and a tenant management process space 110. Tenant database 108 might be divided into individual tenant storage areas 112, which can be either a physical arrangement or a logical arrangement. Within each tenant storage area 112, user storage 114 might similarly be allocated for each user.

It should also be understood that each application server 100 may be communicably coupled to database systems, e.g., system database 106 and tenant database(s) 108, via a different network connection. For example, one server $100_1$ might be coupled via the Internet 14, another server $100_{N-1}$ might be coupled via a direct network link, and another server $100_N$ might be coupled by yet a different network connection. Transfer Control Protocol and Internet Protocol (TCP/IP) are preferred protocols for communicating between servers 100 and the database system, however, it will be apparent to one skilled in the art that other transport protocols may be used to optimize the system depending on the network interconnect used.

In preferred aspects, each application server 100 is configured to handle requests for any user/organization. Because it is desirable to be able to add and remove application servers from the server pool at any time for any reason, there is preferably no server affinity for a user and/or organization to a specific application server 100. In one embodiment, therefore, an interface system (not shown) implementing a load balancing function (e.g., an F5 Big-IP load balancer) is communicably coupled between the servers 100 and the user systems 12 to distribute requests to the servers 100. In one aspect, the load balancer uses a least connections algorithm to route user requests to the servers 100. Other examples of load balancing algorithms, such as round robin and observed response time, also can be used. For example, in certain aspects, three consecutive requests from the same user could hit three different servers, and three requests from different users could hit the same server. In this manner, MTS 16 is multi-tenant, wherein MTS 16 handles storage of different objects and data across disparate users and organizations.

As an example of storage, one tenant might be a company that employs a sales force where each salesperson uses MTS 16 to manage their sales process. Thus, a user might maintain contact data, leads data, customer follow-up data, performance data, goals and progress data, etc., all applicable to that user's personal sales process (e.g., in tenant database 108). In the preferred MTS arrangement, since all of this data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's sales data might be separate from other users' sales data regardless of the employers of each user, some data might be organization-wide data shared or accessible by a plurality of users or all of the sales force for a given organization that is a tenant. Thus, there might be some data structures managed by MTS 16 that are allocated at the tenant level while other data structures might be managed at the user level. Because an MTS might support multiple tenants including possible competitors, the MTS should have security protocols that keep data, applications and application use separate. Also, because many tenants will opt for access to an MTS rather than maintain their own system, redundancy, up-time and backup are more critical functions and need to be implemented in the MTS.

In addition to user-specific data and tenant-specific data, MTS 16 might also maintain system level data usable by multiple tenants or other data. Such system level data might include industry reports, news, postings, and the like that are sharable among tenants.

In certain aspects, client systems 12 communicate with application servers 100 to request and update system-level and tenant-level data from MTS 16 that may require one or more queries to database system 106 and/or database system 108. MTS 16 (e.g., an application server 100 in MTS 16) generates automatically one or more SQL statements (the SQL query) designed to access the desired information.

Each database can generally be viewed as a collection of objects, such as a set of logical tables, containing data fitted into predefined categories. A "table" is one representation of a data object, and is used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided. For CRM database applications, such standard entities might include tables for Account, Contact, Lead and Opportunity data, each containing pre-defined fields.

Figure 3:
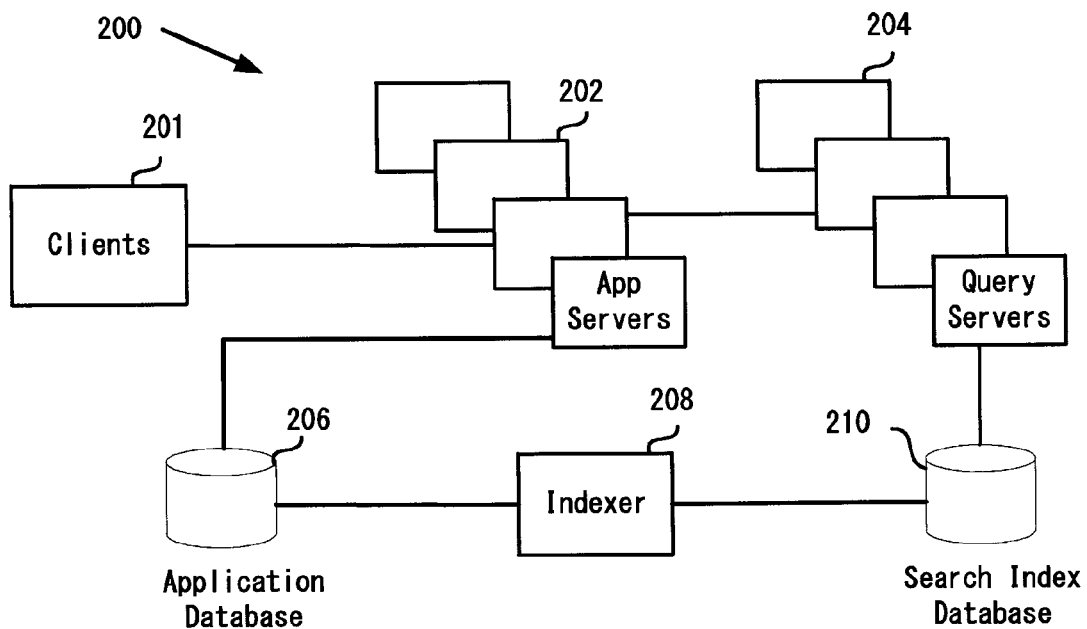
FIG. 3 illustrates a schematic diagram of an exemplary system for performing searches in accordance with one or more embodiments.

FIG. 3 illustrates a schematic diagram of an exemplary system 200 for performing searches using search indexes. Various components of System 200 may be in communication with each other, as shown, through a LAN or a WAN. The system includes one or more applications servers 202. Application Servers 202 may be combined with a load balancer (not shown) for the purpose of evenly distributing the workload among Application Servers 202 and to provide system scalability. In some embodiments, Clients 201 may comminute with Application Servers 202 through other intermediate layers such as a HTTP/S server. The link between Clients 201 and Application Server 202 may be an internal network or the Internet. The search queries sent by Clients 201 are parsed by Application Server 202 and changed to a format that is suitable for execution by Query Servers 204. Many other details of Application Servers 202 are well known in the art, hence a detailed discussion is being omitted.

System 200 further includes an application database 206. In one embodiment Application Database 206 is a relational database that provides storage for business related data. In another embodiment, Application Database 206 may be any type of storage that is capable of being queried and in response, capable of providing results to the queries. In one embodiment, Application Database 206 may be MTS 16. As explained earlier in great details, MTS 16 provides logically separate storage for business data for distinct organizations (e.g., business clients of an application hosting company). System 200 also includes an indexer 208. Indexer 208 browses Application Database 206 to retrieve keywords from database records in Application Database 206. Indexer 208 stores the retrieved keywords and their respective locations within the database records in Application Database 206 in a search index 210. Search Index 210 may be a relational database or any other type of data store that is capable of being queried by Query Servers 204. In one embodiment, Search Index 210 may be a series of one or more files stored in a file system. In one embodiment, Indexer 208 runs at pre-selected intervals to retrieve changes in the database records of Application Database 206. In one embodiment, Search Index 210 may be located in the same physical or logical database as Application Database 206. In another embodiment, Search Index 210 is maintained on a separate physical or virtual host. System 200 components may be hosted on physical hosts as well as in virtual machines running on physical hosts.

Still referring to FIG. 3, System 200 further includes one or more Query Servers 204. A number of Query Servers 204 may depend, among other things, on system load. A load balancer (not shown) may be included to evenly distribute the load among all available Query Servers 204. A query server receives a search query from a client through an application server. The query server then executes the query against Search Index 210 to match the keywords being searched, including their synonyms, with the content of Search Index 210. If one or more matches are found in Search Index 210, the actual data is retrieved from Application Database 206 through the locations (stored in Search Index 210) of the found matches.

Figure 4:
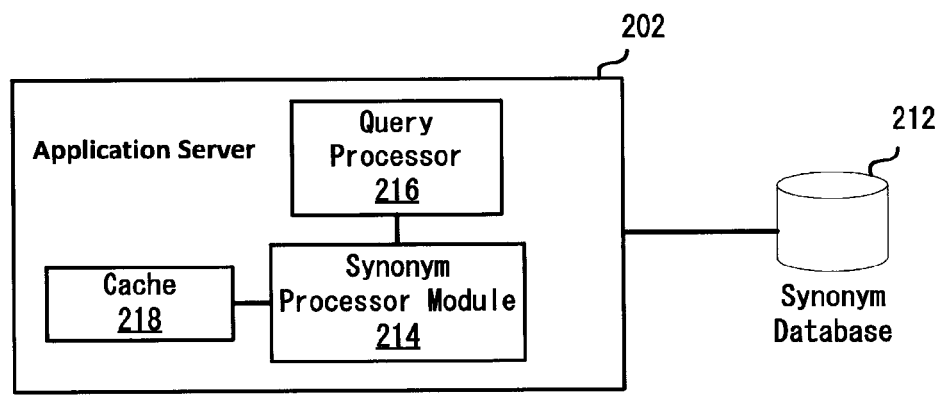
FIG. 4 illustrates a schematic diagram of a section of an application server for preparing search queries for synonym supported searches in accordance with one or more embodiments of the present invention.

FIG. 4 illustrates a part of an application server. In one embodiment, the application server includes a synonym cache module 218. Cache 218 contains synonym data, which is retrieved from a synonym database 212. In one embodiment, the data in Cache 218 is refreshed periodically at selected intervals. In another embodiment, the data in Cache 218 is refreshed at cache miss events. For example, if Cache 218 is searched for a particular keyword and if the keyword doesn't exist, Cache 218 is refreshed from Synonym Database 212.

Synonym Database 212, in one embodiment, may reside in Application Database 206. In a multi-tenant database environment, Synonym Database 212 may include logically separate synonyms database for different customer organizations. In other embodiments, Synonym Database 212 may exist separate from Application Database 206. Cache 218 may be local to an application server or it may also be shared among other application servers in System 200. If Cache 218 is shared, it may exist on a host that is accessible to Application Servers 202. In the multi-tenant database environment, Cache 218 may include logically separate data for different client organizations. In one embodiment, Application Servers 202 (and/or other system components) are capable of identifying a relationship between the data being searched and a client organization to effectuate retrieval of data only from the logically separated databases for a particular client organization.

Still further, an application server may include a query processor 216. Query Processor 216 receives a search query from a client and parses the search query to retrieve searched keywords or phrases, or both. Cache 218 is maintained to increase efficiency of searching synonyms for the parsed keywords. Synonym Processor Module 214 performs a lookup for each of the parsed keywords to find their synonyms from Cache 218. In another embodiment, Synonym Processor Module 214 may also perform such lookup directly at Synonym Database 212. In one embodiment, Synonym Processor Module 214 may be configured to perform a synonym lookup at external synonym databases (for example, online services provided by Dictionary.com™ or other similar third parties). In one embodiment, the data retrieved from Synonym Database 212 or Cache 218 may be combined with the synonym data retrieved from an external synonym database. In one exemplary embodiment, System 200 is preconfigured for the sources of synonym data. In yet another embodiment, individual search query may specify the sources of synonym data.

Figures 5, 6:
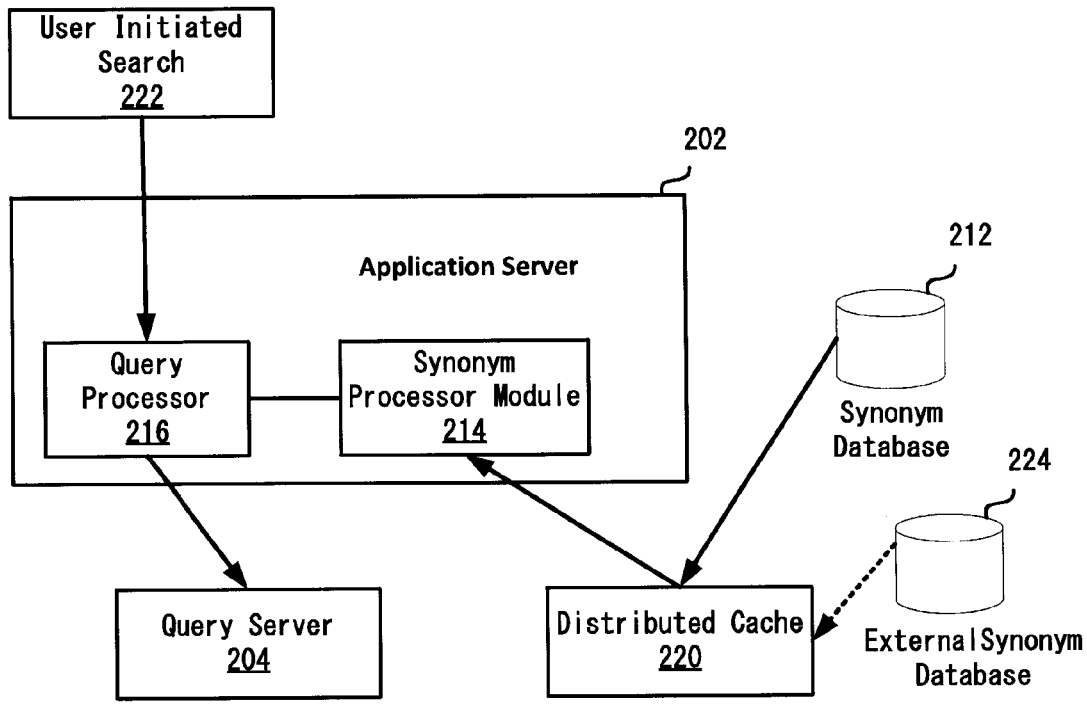
FIG. 5 illustrates a schematic diagram of a section of a system for performing synonym supported searches in accordance with one or more embodiments of the present invention.
FIG. 6 illustrates an exemplary table for storing synonyms in accordance with one or more embodiments the present invention.

Referring now to FIG. 5, which illustrates in more details the process and system for performing synonym supported searches. Accordingly, an application server 202 receives a user initiated search 222. User Initiated Search 222 typically originates from a client 201. User Initiated Search 222 may be initiated manually by a user or it may also be initiated by either a client system or a module in the application server itself in response to some operation requested to be performed by the client. User Initiated Search 222 typically includes a search query, which includes one or more searched keywords or phrases. User Initiated Search 222 is received by Query Processor 216 inside the application server. In another embodiment, a shared query processor may be employed by a plurality of application servers in System 200. Synonym Processor Module 214 works in conjunction with Query Processor 216 to retrieve the searched keywords and phrases in User Initiated Search 222 and compiling their corresponding synonyms from Distributed Cache 220. Distributed Cache 220, in one embodiment, includes synonym data from Synonym Database 212. In another embodiment, Distributed Cache 220 may include synonym data from External Synonym Database 220, as explained in FIG. 4. In one embodiment, Synonym Processor Module 214 may directly retrieve synonym data from Synonym Database 212 or from External Synonym Database 220.

Distributed Cache 220 is populated with the data retrieved from Synonym Database 212 or External Synonym Database 224, or both. In another embodiment, synonym data is retrieved directly from Synonym Database 212 or External Synonym Database 224, or both. In one embodiment, External Synonym Database 224 is provided by third party services. In another embodiment, External Synonym Database 224 is maintained internally within the System 200 hosting organization. In some embodiments, Synonym Database 212 may have logical separations for each client organization that uses MTS 16. Synonym Database 212 may also include global synonyms data store that is accessible and can be used for search queries from any client organizations within MTS 16. In one embodiment, global synonyms are only available to the subscribing client organizations.

After retrieving synonym data from Distributed Cache 220, the search query in User Initiated Search 222 is modified to include the retrieved synonym data. The term "query modification" as used herein means that the search query in User Initiated Search 222 is modified to include synonyms for the searched keywords or phrases. For example, suppose if the search query is in the SQL format and configured to retrieve data for the term "Ben and Jerry," a pertinent part of the modified query may appear as "(Ben OR Benjamin) AND (Jerry OR Jerome). Of course, the assumption being that Synonym Database 212 includes the synonym "Benjamin" for the word "Ben" and the synonym "Jerome" for the word "Jerry." In one embodiment, the modification is performed at the application server level. In another embodiment, synonym data along with the search query is sent to Query Server 204 and Query Server 204 modifies the search query before performing a data search through database indexes. Query Server 204 then performs a search according to the description provided by FIG. 3. It may be noted that a search query may be provided in formats (e.g., LDAP query, unstructured text, etc.) other than SQL format.

FIG. 6 illustrates an exemplary table 250 for storing synonyms. It should be noted that synonyms may be stored in many other formats that provide support for storage of key-value pairs. Table 250 includes a key column 252 for storing synonym keys and a synonym column 254 for storing one or more synonyms for a synonym key. It may be noted that more than one synonym may be stored in each row of Synonym Column 254. In one exemplary embodiment, each of the values may be separated by some character such as a comma or semi-colon. Many other formats may be possible, for example having multiple columns, one for each synonym value or having multiple rows in the database, one for each synonym. Table 250 is stored in Synonym Database 212. In another embodiment, synonym data in form of a file may be a used. The file may be loaded in Distributed Cache 220 instead of using Table 250. Distributed Cache 220 then loads synonym data in a map or similar object that is capable of efficiently handling key-value pairs or tabular data.

Synonym data in Table 250 is typically entered manually by system users or administrators. In one embodiment, a graphical user interface is provided to facilitate entry of synonym data in Synonym Database 212. In another embodiment, synonym data may be batch uploaded from a file through an upload interface. In yet another embodiment, a synonym collector module (not shown) in System 200 may browse various synonym dictionaries to collect synonym data and populate Table 250. The synonym data in Table 250 may then be modified or updated by one or more users or administrator of System 200.

Referring back for a moment to the process of query modification as described in FIG. 5 and the sample data shown in FIG. 6. If a search query includes the search term "ata," the query will automatically be modified to include the search terms "a.t.a.," "serial-ata," serial ata," "external serial ata" and "esata." As apparent, such modified query will greatly enhance the quality and width of the retrieved data for search queries.

In a preferred embodiment, if a searched term is not found in Key Column 252, then Synonym Database 212 does not return any synonym value for the searched term. In one exemplary embodiment, if the searched term is not found in Key Column 252, Synonym Column 254 is searched for the searched term. If a match is found for the searched term, one or more values present in the particular row in which the match is found are returned. For example (and referring to the sample data in FIG. 6), if the searched term is "Home" then the corresponding values "House" and "castle" are returned. However, if in the preferred embodiment, the searched term is "house" then no value will be returned because Key Column 252 does not contain the term "house." However, in the alternate embodiment, since the term "house" is present in Synonym Column 254, the values "home" and/or "castle" will be returned as synonyms because both of these values are present in the row in which the searched term exists. In the exemplary embodiment, if the searched term is found in multiple rows, the system can be configured to return either values from all matched rows or from a predefined row (for example, from the first matched row only).

In one embodiment, the system may be configured to broaden or narrow synonym searches. In one example, to broaden the synonym search, search depth levels may be specified. For example, as a default, a searched term will first be searched in Key Column 252 and if a match is found, the synonyms (in Synonym Column 254) for the searched term may be returned back. However, if the synonym search is broadened to another level, each synonym value found in Synonym Column 254 is then searched in Key Column 252 and if one or more matched are found, the corresponding synonym values from Synonym Column 254 are also returned. This process may be repeated based on the configured depth of synonym searches.

Figure 7:
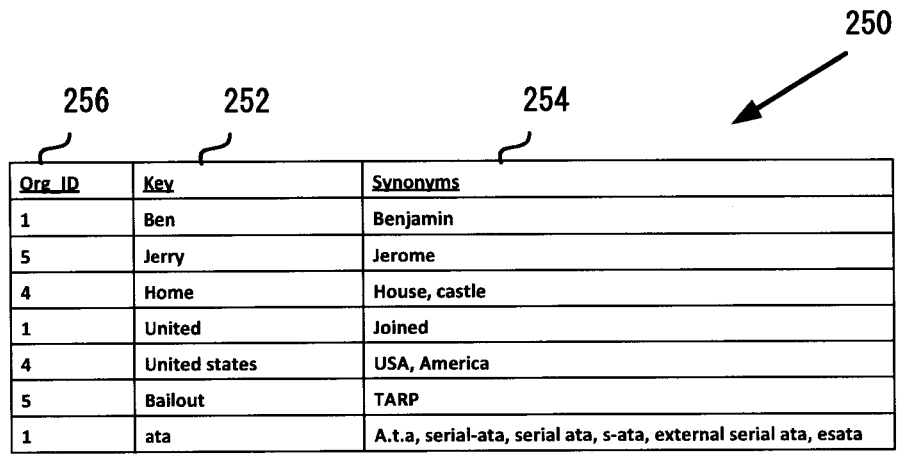
FIG. 7 illustrates an exemplary table for storing synonyms in a MTS in accordance with one or more embodiments the present invention

FIG. 7 illustrates Table 250 in an exemplary multi-tenant database environment. In the multi-tenant database environment, Table 250 may include synonyms for more than one client organizations. The synonym data for each of these client organizations is logically separated using an exemplary field Org_Id 256. In multi-tenant database environment, a search query shall include an org-id and synonym searches are filtered by the org-id field. In one embodiment, if a synonym search query does not include the org-id field, then the global synonym data is searched, if available.

Figure 8:
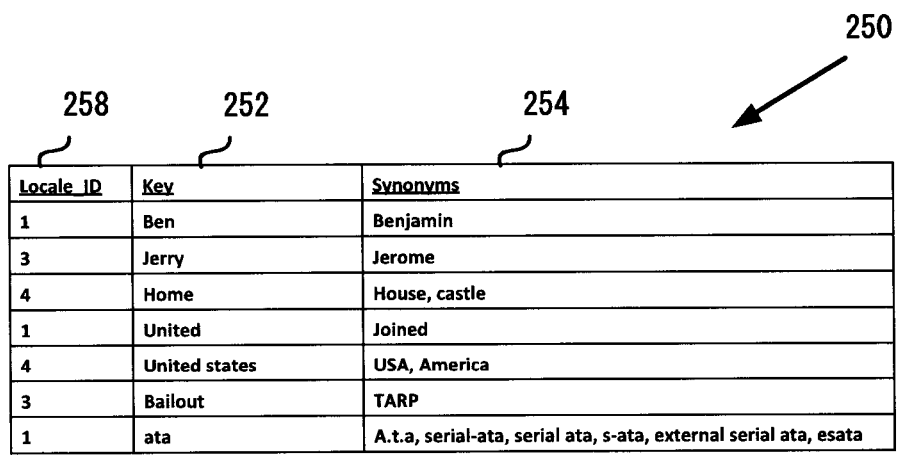
FIG. 8 illustrates an exemplary table for storing synonyms according to locales in accordance with one or more embodiments the present invention.

FIG. 8 illustrates Table 250 in another exemplary embodiment. Note that various embodiments of Table 250 may coexist. For example, the embodiments of FIG. 7 may be combined with the embodiments described in FIG. 8. In this embodiment, Table 250 includes a column Locale_Id 258. Locale_Id Column 258 may be used for storing locale information for each synonym key and to filter synonym search results by locale. For example, synonyms in Table 250 may be associated with languages and depending upon the locale supplied by the search query, synonym search results may be filtered by a language.

Figure 9:
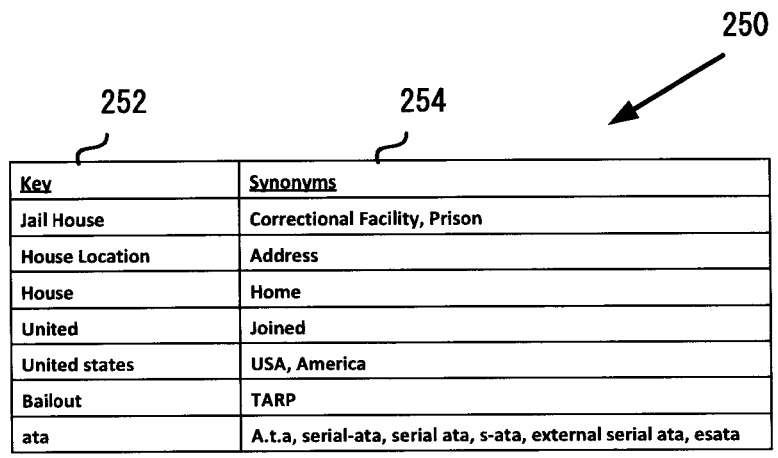
FIG. 9 illustrates an exemplary table for storing synonyms, including synonyms for phrases in accordance with one or more embodiments the present invention.

FIG. 9 illustrates Table 250 in yet another exemplary embodiment that provides functionality to support overlapping search terms and support for composite searched terms. If a search query includes composite terms or phrases, various embodiments are provided to effectively search for synonyms. Table 250 may include synonyms for the individual parts of composite terms or phrases. For example, the exemplary data in FIG. 9 shows both "Jail House" and "House" as keys in Key Column 252. Hence, if a search query includes the term "Jail House," a decision needs to be made whether to retrieve synonyms for the term "Jail House" or for the term "House" or both. In one embodiment, System 200 is configured to retrieve synonyms for composite terms (e.g., the term "Jail House" in the example) only and disregard synonyms for the words contained in the composite terms. In another embodiment, synonyms for both a composite term and the parts of the composite term are retrieved and used in the modified search query.

Figure 10:
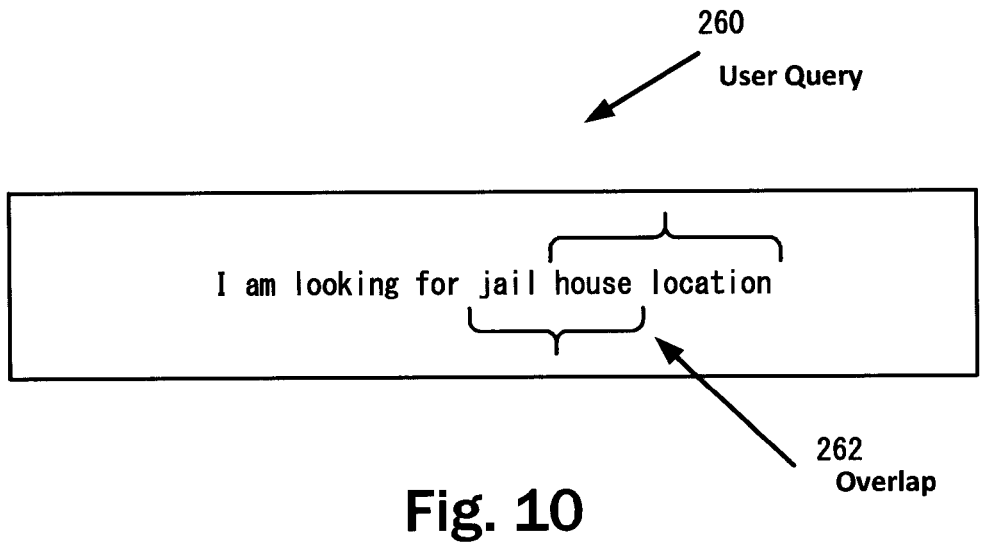
FIG. 10 illustrates an example of overlapping phrases in a search query in accordance with one or more embodiments the present invention.

FIG. 10 illustrates an exemplary user query 260 that includes overlapping search terms. In one embodiment, all search terms are parsed into individual words and a synonym lookup is performed on these individual words. For example, synonyms for words "jail," "house" and "location" are searched individually in Table 250. In another embodiment, an overlapping word (e.g., the word "house" in the example) is associated with the word preceding the overlapping word (e.g., the word "jail" in the example) and then synonym lookups are performed on "Jail house" and "location" individually. In another embodiment, the overlapping word is associated with the word that follows the overlapping word 262 (e.g., the word "location" in the example) and then synonym lookups are performed on individual terms (e.g., the terms "jail" and "house location"). In yet another embodiment, the overlapping word is associated with both the preceding and following words and then synonym lookups are performed on the resultant terms (e.g., the terms "jail house" and "house location"). In yet another embodiment, if the whole term (e.g., "jail house location") is available in Key Column 252 then the composite term is not parsed into individual words or terms.

In one exemplary embodiment, an intermediate query is sent to Synonym Database 212 to determine if a composite term (i.e., a multi-word term) or phrase (e.g., "jail house location" in the example) is available in Key Column 252. If an affirmative response is received, the composite term is not parsed into individual terms. If a negative response is received, the composite term is parsed into all possible combinations (e.g., into "jail house" and "house location") and each of these combinations are searched in Key Column 252. If a match is found for a particular term, no further parsing is performed on that particular term, otherwise the process continues and the term is parsed again into other possible individual words or terms until no further parsing is possible (e.g., when the term is reduced to a word). In another embodiment, the above described process is performed even after matches are found to collect all possible synonyms for term combinations and then the retrieved synonyms are used with their corresponding search terms (using a logical OR relationship) in the modified search query.

In one embodiment, search terms for which synonyms are retrieved are assigned different weights based on their respective locations in a search query. In another embodiment, longer terms may have higher weight compared to shorter terms. Further, the system may be configured to retrieve a certain maximum number of synonyms for a term or word with a specific weight. Accordingly, more synonyms may be retrieved for search terms or words with higher weights compared to search terms or words with lower weights. Still further, the original terms may be given higher weights compared to their synonyms. In one embodiment, query servers are configured to take the respective weights of each of the searched terms in a query, while performing searches.

Figure 11:
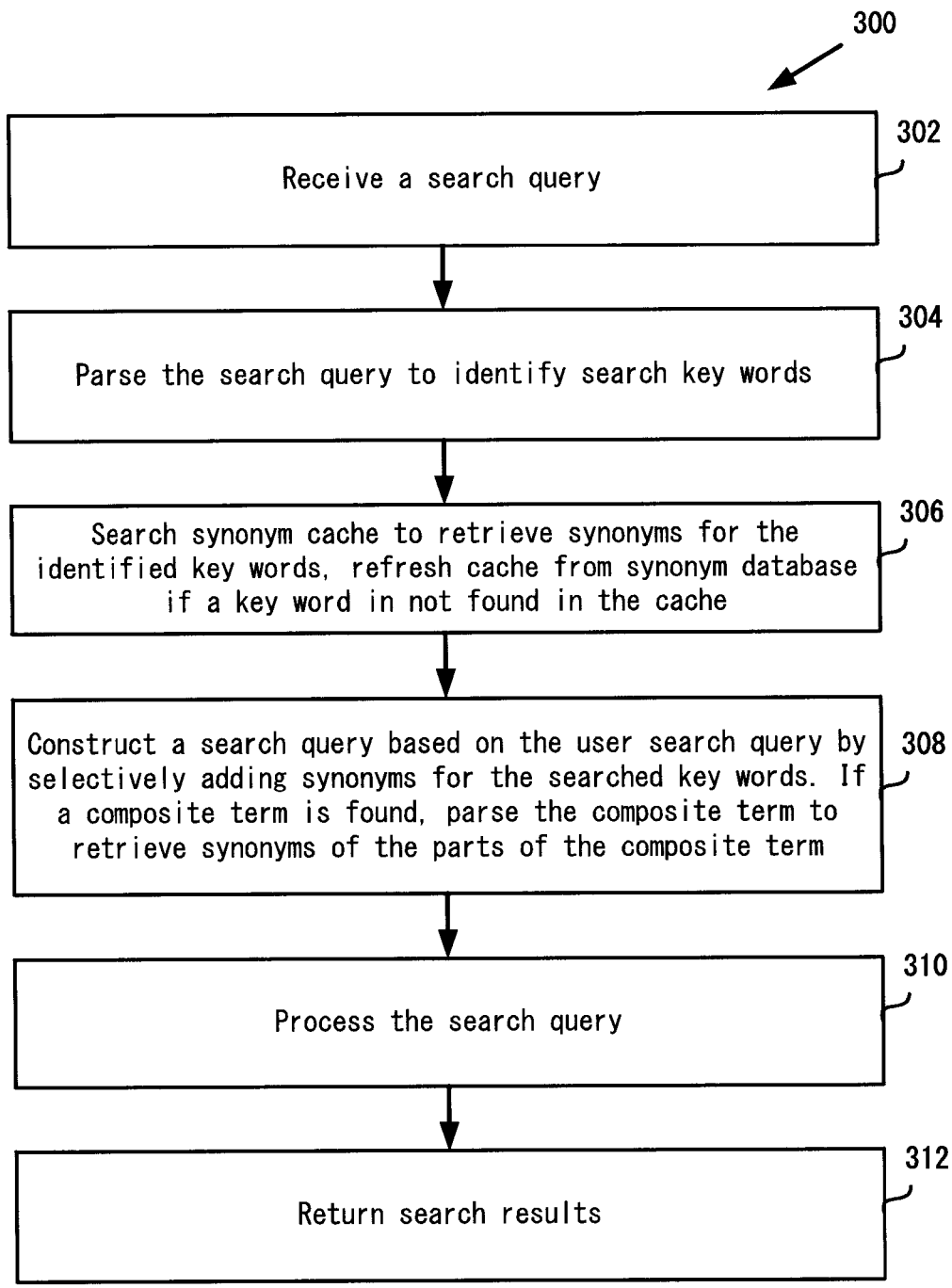
FIG. 11 illustrates a flow diagram for performing synonym supported searches in accordance with one or more embodiments the present invention.

FIG. 11 illustrates a flow diagram 300 for performing synonym supported searches. Accordingly, at step 302 a search query is received from a client. At step 304, the search query is parsed to identify search key words. At step 306, a synonym cache is searched to retrieve available synonyms for the parsed search key words according to one or more of the previously described embodiments. If a searched keyword or term is not found in the synonym cache, the synonym cache is refreshed from a synonym database. At step 308, a search query is constructed based on the user search query by selectively adding synonyms for the searched key words and terms according to the previously described embodiments. At step 310, the modified query is processed by a query server and at step 312, results of the search query is returned to the client.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. In one embodiment, the apparatus can be specially constructed for the required purpose (e.g. a special purpose machine), or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A computer implemented method for performing a data search through a search query, the method comprising:
   receiving the search query including an organization identification that identifies one of a plurality of organizations being serviced in a multi-tenant database service environment;
   parsing the search query to retrieve a search phrase, the search phrase including a plurality of words;
   in the search phrase, identifying a first combination of two or more of the plurality of words and a second combination of two or more of the plurality of words, the first combination and the second combination having a common term, wherein the first combination ends with the common term and the second combination begins with the common term;
   retrieving, according to the organization identification, synonyms for the first combination and the second combination from a synonym storage;
   modifying the search query to include the first combination in a logical OR relationship with the synonyms of the first combination and the second combination in a logical OR relationship with the synonyms of the second combination; and
   executing the modified search query against a data store.

2. The method as recited in claim 1, wherein if the synonyms for the first combination do not exist, removing the common term from the first combination prior to the retrieving.

3. The method as recited in claim 1, wherein if the synonyms for the second combination do not exist, removing the common term from the second combination prior to the retrieving.

4. The method as recited in claim 1, wherein the retrieving further includes identifying separate words in the first combination and retrieving synonyms for each of the separate words.

5. The method as recited in claim 1, wherein the retrieving further includes identifying separate words in the second combination and retrieving synonyms for each of the separate words.

6. The method as recited in claim 1, wherein the common term is removed from the first combination prior to the retrieving.

7. The method as recited in claim 1, wherein the common term is removed from the second combination prior to the retrieving.

8. The method as recited in claim 7, wherein the second combination is appended to the first combination after removing the common term and the second combination is set to a black value, prior to the retrieving.

9. The method as recited in claim 1, wherein the data store is a multi-tenant database, the multi-tenant database includes logically separated data for the plurality of organizations.

10. The method as recited in claim 1, wherein at least one of the first combination of two or more of the plurality of words and the second combination of two or more of the plurality of words includes a combination of words in proximity.

11. A non-transitory computer readable media including program instructions for performing a data search through a search query, the program instructions when executed by a microprocessor performs method steps of:
    receiving the search query including an organization identification that identifies one of a plurality of organizations being serviced in a multi-tenant database service environment;
    parsing the search query to retrieve a search phrase, the search phrase including a plurality of words;
    in the search phrase, identifying a first combination of two or more of the plurality of words and a second combination of two or more of the plurality of words, the first combination and the second combination having a common term, wherein the first combination ends with the common term and the second combination begins with the common term;
    retrieving, according to the organization identification, synonyms for the first combination and the second combination from a synonym storage;
    modifying the search query to include the first combination in a logical OR relationship with the synonyms of the first combination and the second combination in a logical OR relationship with the synonyms of the second combination; and
    executing the modified search query against a data store.

12. The non-transitory computer readable media as recited in claim 11, further comprising programming instruction to determine if the synonyms for the first combination do not exist and removing the common term from the first combination prior to the retrieving.

13. The non-transitory computer readable media as recited in claim 11, further comprising programming instruction to determine if the synonyms for the second combination do not exist and removing the common term from the second combination prior to the retrieving.

14. The non-transitory computer readable media as recited in claim 11, wherein programming instructions for the retrieving further includes programming instructions for identifying separate words in the first combination and retrieving synonyms for each of the separate words.

15. The non-transitory computer readable media as recited in claim 11, wherein programming instructions for the retrieving further includes programming instructions for identifying separate words in the second combination and retrieving synonyms for each of the separate words.

16. A system for performing a data search through a search query, the system comprising:
    an application server in communication with a client computing system, the application server including a synonym processing module in communication with a synonym database, the synonym processing module being configured to retrieve, according to an organization identification, synonyms for overlapping combinations of two or more of a plurality of words in the search query, the overlapping combinations having an overlapping common term and the search query including the organization identification that identifies one of a plurality of organizations being serviced in a multi-tenant database service environment;

a query server in communication with the application server, the query server also being in communication with an index database;

a data store in communication with the query server; and an indexer module to retrieve keywords from the data store and to store, in the index database, the keywords and location of the keywords in the data store.

17. The system as recited in claim 16, wherein the application server further including a distributed cache to store at least some content of the synonym database.

18. The system as recited in claim 17, wherein the distributed cache is configured to retrieve synonym data from at least one of the synonym database or an external synonym database.

19. The system as recited in claim 16, wherein the data store is a multi-tenant database, the multi-tenant database includes logically separated data for the plurality of organizations.

20. The system as recited in claim 19, wherein the synonym database includes synonym data that is logically separated for the plurality of organizations.

* * * * *